United States Patent [19]
Schechner et al.

[11] Patent Number: 5,306,901
[45] Date of Patent: Apr. 26, 1994

[54] PRODUCTION CONTROL BY MULTIPLE BRANCH BAR-CODE READERS

[76] Inventors: Pinchas Schechner, 7, Hadkalim St.; Moshe Gavish, 36a Hadafna St., both of Kiryat-Bialik, Israel

[21] Appl. No.: 853,036

[22] Filed: Mar. 17, 1992

[30] Foreign Application Priority Data

Jun. 2, 1991 [IL] Israel .................................. 098337

[51] Int. Cl.⁵ .............................................. G06K 7/10
[52] U.S. Cl. ..................................................... 235/473
[58] Field of Search ......................................... 235/473

[56] References Cited

U.S. PATENT DOCUMENTS

| | | | |
|---|---|---|---|
| 3,737,629 | 6/1973 | See | 235/473 |
| 3,792,239 | 2/1974 | Olhalber et al. | 235/473 |
| 3,886,328 | 5/1975 | Harms, Jr. et al. | 235/473 |
| 3,953,730 | 4/1976 | Henry et al. | 250/227 |
| 4,283,622 | 8/1981 | Passer et al. | 235/473 |
| 4,286,145 | 8/1981 | Palmer | 235/473 |
| 4,423,923 | 1/1984 | Frazier et al. | 350/96.15 |
| 4,629,876 | 12/1986 | Kubota et al. | 235/473 |
| 4,780,600 | 10/1988 | Johnston | 235/473 |
| 4,801,789 | 1/1989 | Davis | 235/473 |
| 4,847,490 | 7/1989 | Nishikama | 235/473 |
| 4,900,907 | 2/1990 | Matusima et al. | 235/472 |
| 5,021,651 | 6/1991 | Ishikawa | 235/473 |

FOREIGN PATENT DOCUMENTS

| | | |
|---|---|---|
| 2937753 | 4/1981 | Fed. Rep. of Germany . |
| 3400791 | 7/1985 | Fed. Rep. of Germany . |
| 3423131 | 1/1986 | Fed. Rep. of Germany . |
| 204332 | 11/1983 | German Democratic Rep. . |
| 2109598 | 6/1983 | United Kingdom . |
| 2163584 | 2/1986 | United Kingdom . |

*Primary Examiner*—E. Rollins Cross
*Assistant Examiner*—Erick Solis
*Attorney, Agent, or Firm*—Frishauf, Holtz, Goodman & Woodward

[57] ABSTRACT

Equipment for the collection of bar-code data from a plurality of work stations in a central processing station comprises an optical scanner at each work station connected to the central station by means of an optical fiber; all optical fibers arriving from the work stations are assembled in a fiber-assembly bracket with their rear ends arranged in one or more parallel lines positioned opposite a lens system; and the lens system transfers the alternating light and dark signals issuing from each fiber end to the photo-sensitive end of a corresponding channel of a detector, preferably a charge-coupled device. The detector converts the received light signals into electrical analog signals and transfers these to the central processing unit, where they are converted into digital signals for processing and storing in memory means.

13 Claims, 3 Drawing Sheets

PRODUCTION CONTROL BY MULTIPLE BRANCH BAR-CODE READERS

BACKGROUND OF THE INVENTION

The invention relates to control of the production of multiple articles by means of centralized information received by bar-code reading. It relates particularly to the control of various work stations and workers, each destined to fabricate or part-fabricate a certain article and to inform a central authority of the amount of work carried out within a given time interval.

In many industries parts of a whole assembly are manufactured by hand or machines at several work stations and are finally assembled in additional work stations by other workers. A typical example is the garment industry, where garment parts, such as sleeves, trouser legs, collars and so on are fabricated by workers using sewing and other machines and where the work is distributed in a manner that every part arrives at the assembly station or stations in quality and quantity required for an even flow of work. It will be understood that intricate parts which require more working time are distributed to more work stations than simple parts which can be made in a shorter period, and it is highly important that these operations be minutely controlled to prevent bottlenecks on one hand and idling of workers on the other.

The simplest and most expensive way of controlling product is by means of an inspector who walks from station to station and writes down the quantity of articles manufactured and the time taken therefore. This way has been mostly superseded, at least in modern plants, by attaching to every batch to be completed a label containing a bar-code defining the kind and quantity of the article to be prepared at each station. Upon finishing a batch the worker passes the label underneath a scanner which is connected to a processing unit, the latter transmitting the gathered information to a central processing unit.

This method is exact and provides the required information in real time, but its main drawback is the high cost of the data collecting equipment. It is, therefore, the object of the present invention to provide and transmit the information regarding completion of a certain work task within the prescribed time for immediate recording at the control office and for storage for future reference.

It is another object to reduce the cost of gathering information by conversion of the optical signal provided by the bar-code slip into digital information by means of a central multi-channel detector, and by subsequent conversion of the digital information into alphanumeric information by means of a central processing unit.

It is another important object to provide equipment for the task at relatively low cost, in order to enable even small establishments to purchase and install the production control means according to the present invention.

And it is a final object to make operation of the bar-code transmission as simple as possible, enabling every worker to handle the equipment at ease without the requirement of previous and lengthy training.

SUMMARY OF THE INVENTION

A general example of equipment suitable for production control of articles produced at a plurality of work stations and adapted for bar-code reading at each station and its transmission to a central control station comprises essentially, an optical fiber extending from each work station to said central control station, said optical fiber being adapted to transfer the signals of alternating dark and light from its one end to its other, an optical scanner enclosing the front end of said optical fiber and suitable for being moved across a bar-code, close enough for transmitting clear signals of dark and light, a detector provided with an array of a plurality of channels, each channel having a photo-sensitive end portion and being adapted to convert light signals received by the end portion into an output of electrical analog signals, the detector being mounted at a central control station, with the photo-sensitive end portion of each channel coupled to the rear end of one of the optical fibers extending from the work stations, a central processing unit (CPU) coupled to the detector, adapted to convert the analog signals into digital signals and to transmit these to a memory for recording and storage in a manner known to the art.

The detector may be in the form of a Charge Coupled Device, a Self-scanned Photodiode Array, or a Charge Injection Device, which are all capable of converting light signals into analog electrical signals.

A preferred embodiment of the scanner is in the form of a short, closed tube enclosing the end portion of an optical fiber, provided with a relative small opening in its bottom end close to the front end of the fiber and with a light source mounted close to the small opening. The light source is preferably a light bulb connected to an electric cell likewise mounted inside the tube, to be actuated by a light switch whenever reading of the bar-code is intended. In order to protect the end of the fiber the opening is preferably covered by a transparent plate of glass or plastics.

The rear ends of all fibers arriving at the detector are closely lined up in a straight line bundle and are either directly connected to a corresponding number of optical sensitive channels of the detector, or their image is transferred to these channels by an optical lens system. This is preferably done by means of a fiber-assembly bracket to which the rear ends of all optical fibers are connected and which serves to line up the fiber ends in a straight line bundle for either direct connection to the detector or for optical transmission of the alternating light signals to the photo-sensitive portion of the detector by said lens system.

DETAILED DESCRIPTION OF THE DRAWINGS

Figure 1:
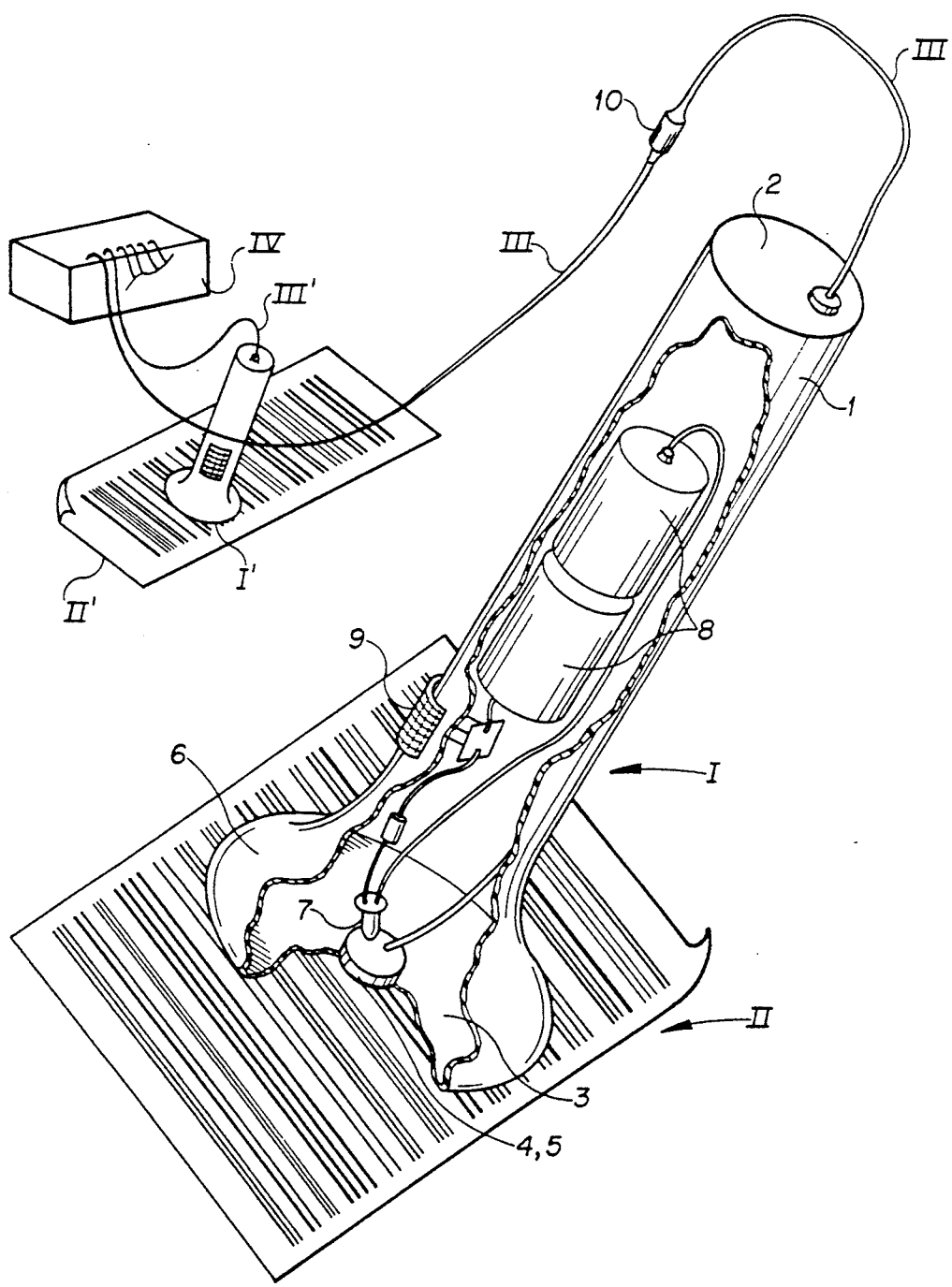
FIG. 1 is an isometric view of the scanner of the invention, with the envelope partly cut away to better viewing of the interior components.

The scanner I shown in FIG. 1 is positioned in contact with a label II which carries a bar-code consisting of spaced-apart, parallel dark lines of various width on a bright background. The scanner includes a tubular casing 1 which is closed at its top 2 and its bottom 3 except for a central aperture 4 which is covered by a transparent plate 5, protecting the interior against penetration of dirt and dust. The bottom portion 6 of the casing is enlarged to ensure better contact with the label II while the scanner is passed across the latter. An optical fiber III extends from the outside through the casing to the bottom close to the aperture 4, its passage through the top being airtight, again to prevent dust from entering the casing. For illumination of the barcode the scanner contains a light bulb 7 positioned close to the aperture 4 and to the end of the optical fiber III, which is supplied by two electric cells 8. A switch 9 permits energizing of the light bulb whenever the scanner is in use, and closing of the circuit after use in order to save energy.

The Figure also shows a second scanner I' moved across another label II', both scanners being connected to a control station IV by fibers III and III'. The picture also shows a fiber connector 10 serving for connecting alternative fibers and scanners.

Figure 2:
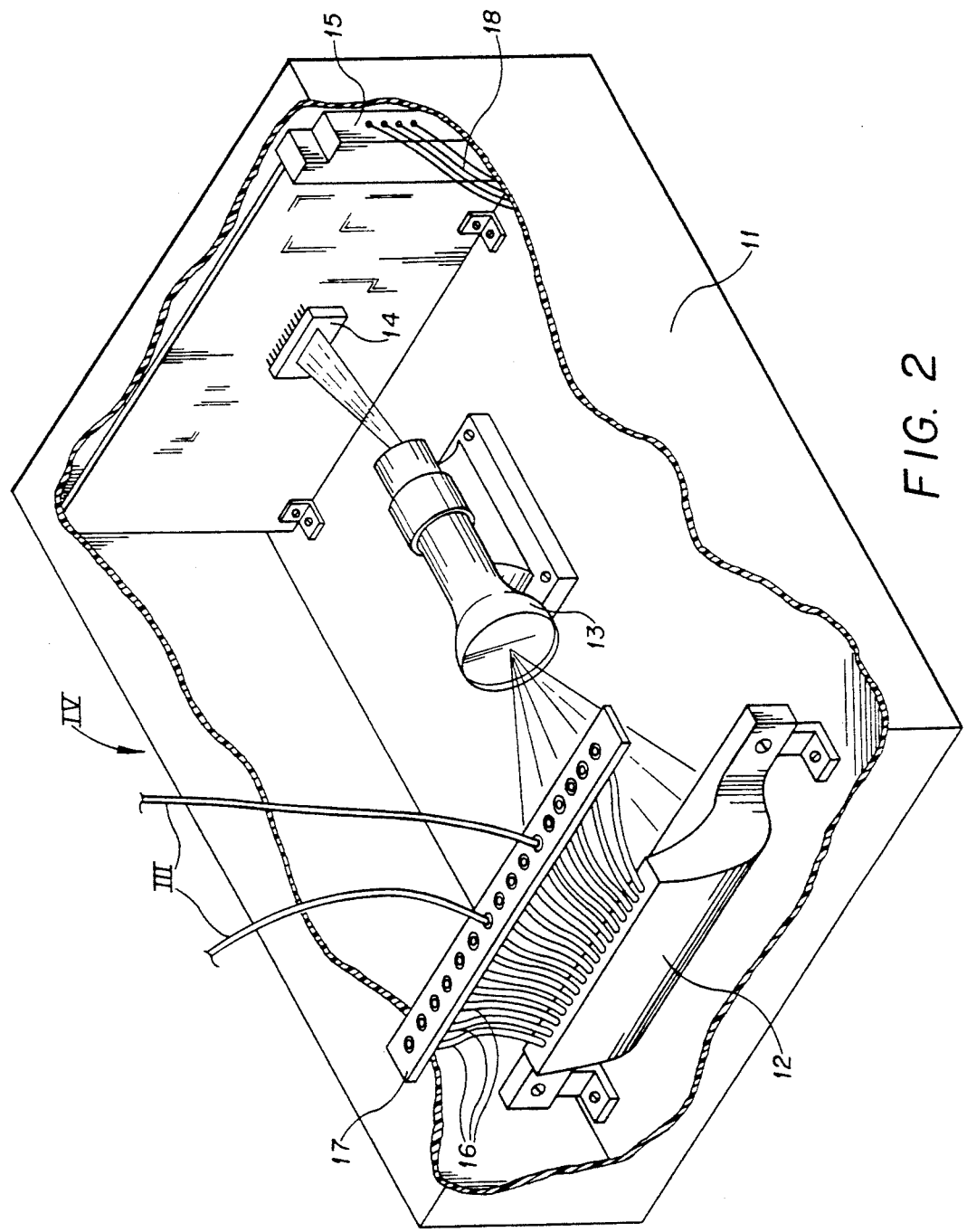
FIG. 2 is an isometric view of the control station showing the transfer of the optical information from the optical fibers to the detector by means of a lens system.

The control station illustrated in FIG. 2 is contained in a casing 11 and comprises a fiber-assembly bracket 12, a lens system 13, a detector 14 attached to a processing unit 15, all firmly mounted on the bottom of the casing. Optical fibers III arriving from separate and remote work stations are connected to first ends of short stretches of fibers 16 by means of an assembly board 17 mounted outside and on top of the casing 11; the fibers are guided inside the bracket 12 into a horizontal and straight-line bundle protruding to the outside of the bracket exactly in the focus of the lens system 13. (Regarding details of the bracket see FIG. 3). The lens system is firmly mounted on the bottom of the casing with its far focus aligned with the photo-sensitive channels of the detector, effecting the images of the ends of the fibers 16 to coincide with these channels, and to transfer the alternating light signals to be projected into the detector. The detector is mounted, in a manner known per se, on a side of the processing unit and connected to corresponding channels thereof. The processing unit is conductively connected by means of wiring 18 to a computer for data storage and for further processing.

Figure 3:
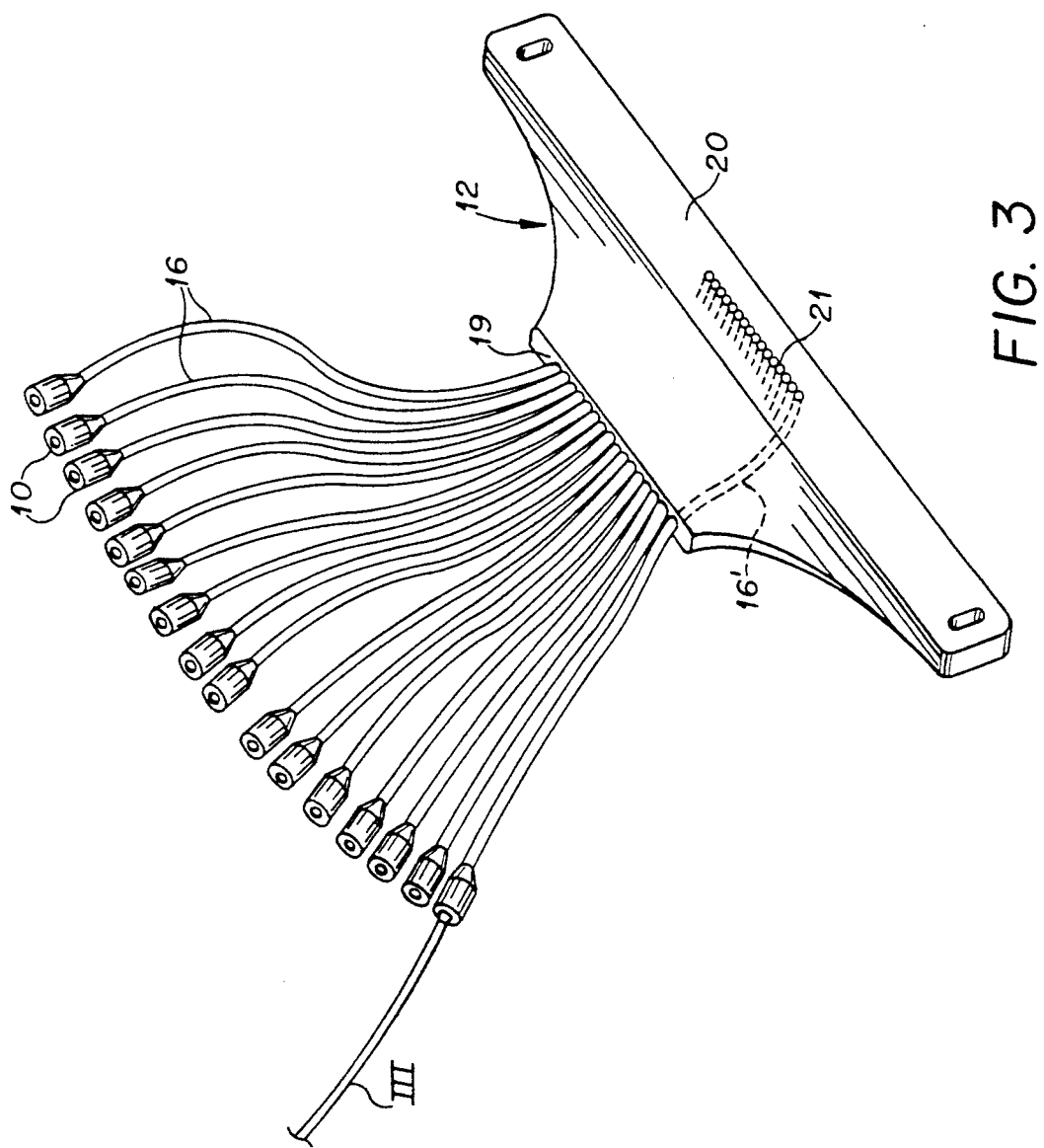
FIG. 3 is an isometric view of the fiber-assembly bracket of the control station.

The fiber-assembly bracket 12 is shown in more details in FIG. 3. Incoming fibers III are connected to short fibers 16 by connectors 10, the latter being mounted on the board 17 shown in FIG. 2. The fibers enter the bracket through apertures in an inlet surface 19, are guided inside the bracket and bent about a right angle, as shown for one single fiber 16', and exit through an exit surface 20 in the form of a straight-line bundle 21, their ends lying in the focus of the lens system 13. The present drawing shows only sixteen optical fibers for the sake of clearness of the drawing, but it will be understood that a much larger number can be used in accordance with the number of work stations to be controlled.

It is understood that the arrangement of the components as shown in FIG. 2 is more or less arbitrary, and that other arrangements and other components may be visualized and used, as long as the method of conveying information is maintained.

It is, for instance, proposed to connect the ends of the optical fibers direct to the channels of the detector, instead of projecting the images by means of a lens system. The bracket may be constructed with the incoming and outgoing ends of the fibers through parallel surfaces, obviating the need to bend the fibers about a right angle.

Although in the foregoing the description refers to a linear charge coupled device as the most economical solution, it is pointed out that other existing embodiments of this device, as well as of the other detectors, may be employed, as for instance charge coupled devices wherein the photo-sensitive end portions of the channels are arranged in several rows and columns or in circular arrangement. It will be understood that in these cases the ends of the optical fibers are arranged in a correspondent pattern, to be connected by couplings or transmitted by an optical lens system.

We claim:

1. Equipment for the collection of bar-code data from a plurality of work stations and for transmission of said bar-code data to a central control station, including production control of articles produced at said work stations, the equipment comprising:
    an optical fiber extending from each work station to said central control station, said optical fiber being adapted to transfer signals of alternating dark and light from its front end at the work station to its rear end,
    an optical scanner at each work station enclosing the front end portion of said optical fiber, suitable for being moved across a bar-code close enough for transmitting clear signals of dark and light through said optical fiber,
    a detector provided with an array of a plurality of channels, each channel having a photo-sensitive end portion and being adapted to convert light signals into electrical analog signals, said detector being positioned at said central control station with said photo-sensitive end portion of each said channel optically coupled to the rear end of one of said optical fibers extending from said work stations, and
    a central processing unit coupled to said detector and adapted to convert analog signals into digital signals and to transmit the digital signals to computer means for data storage and for further processing.

2. A scanner as defined in claim 1, including a casing in the form of a short closed tube with a bottom portion suitable for being moved across an object imprinted with a bar-code and enclosing an optical fiber with the front end of the optical fiber close to said bottom portion, said bottom portion being provided with a relatively small aperture close to the front end of said fiber and with a light source close to said aperture.

3. The scanner as defined in claim 2, wherein said light source comprises a light bulb connected to an electric cell mounted inside said tube and adapted to be actuated by a light switch.

4. The scanner as defined in claim 2, wherein said aperture is covered by a transparent plate.

5. The equipment as defined in claim 1, wherein the rear ends of all said optical fibers are arranged in a pattern cooperating with a pattern of said photo-sensitive end portions of the channels of said detector, the pattern comprising one or more straight rows, and are mechanically coupled to said photo-sensitive end portions.

6. The equipment as defined in claim 1, wherein the rear ends of all said optical fibers are arranged in a pattern cooperating with a pattern of said photo-sensitive end portions of the channels of said detector, and wherein the image of said pattern is transmitted to said photo-sensitive ends by an optical lens system.

7. The equipment as defined in claim 5, wherein said photo-sensitive end portions of said detector channels are aligned in a straight line, and wherein the rear end of each optical fiber extending from one of said work stations is directly coupled to one photo-sensitive end portion of one of said channels.

8. The equipment as defined in claim 6, wherein the rear ends of all optical fibers arriving at said control station are closely lined up into a straight-line bundle and wherein the images of said rear ends are transferred to the photo-sensitive end portions of said detector by means of a lens system.

9. The equipment as defined in claim 8, wherein the rear ends of all the optical fibers are collected and aligned in a straight-line bundle by means of an assembly bracket.

10. The equipment as defined in claim 1, wherein said detector comprises a Charge Coupled Device.

11. The equipment as defined in claim 1, wherein said detector comprises a Self-scanned Photo Diode.

12. The equipment as defined in claim 1, wherein said detector comprises a Charge Injection Device.

13. The equipment as defined in claim 1, wherein the rear ends of all said optical fibers are arranged in a pattern cooperating with a pattern of said photo-sensitive end portions of the channels of said detector, the pattern comprising a circle, and are mechanically coupled to said photo-sensitive end portions.

* * * * *